Sept. 30, 1952     F. A. HESTER ET AL     2,612,429

BUCKING CURRENT CIRCUIT FOR HALF-TONE FIDELITY CORRECTION

Filed Dec. 17, 1948

INVENTOR.
FRANK A. HESTER
JOHN W. SMITH
BY
*Alfred W. Barber*
ATTORNEY

Patented Sept. 30, 1952

2,612,429

UNITED STATES PATENT OFFICE 2,612,429

BUCKING CURRENT CIRCUIT FOR HALF-TONE FIDELITY CORRECTION

Frank A. Hester, New York, and John W. Smith, Whitestone, N. Y., assignors to Faximile, Inc., New York, N. Y., a corporation of Delaware Application December 17, 1948, Serial No. 65,926

2 Claims. (Cl. 346—33)

1

The present invention concerns electrolytic recording systems for facsimile and the like.

One of the more common methods of facsimile recording consists of passing a sheet of moist, electrolytically sensitive recording paper between a stationary linear electrode and a rotating helical electrode, the intersection of the two electrodes constituting a scanning spot which moves from side to side across the sheet as the helix rotates. The line by line advance of the recording sheet, past the electrode elements, completes the scanning operation. Facsimile signals representing graphic material to be recorded may be received by means of a radio receiver or over a wire line and, after being amplified and detected, are impressed across the recording electrodes to produce black and white density variations, point by point on the recording sheet. In one common type of recording, the recording sheet contains a color-lake-forming material and the recording is produced by the deposition of a color-lake on the sheet by dissolving metal from the linear electrode and combining it with the lake-forming material in the sheet. This type of recording process requires the application of direct current across the recording electrode, with the linear electrode positive with respect to the helical electrode. One convenient method of applying the direct current across the recording electrodes is to connect the helical electrode to the plate of a thermionic vacuum tube and the linear electrode to the positive side of the plate voltage supply source. Then, the signals to be recorded, which have been received, amplified and rectified to provide a direct current bias, are applied to the grid of the thermionic vacuum tube. The present invention is concerned with corrections for inherent distortion produced by the thermionic vacuum tube.

In order faithfully to record, half-tone copy, it is important that the plate current flowing through the recording sheet be strictly linear and proportional to the rectified signals applied to the grid of the thermionic vacuum tube. However, it is well known that the plate current of a thermionic vacuum tube is generally linear over only a portion of its input voltage-output current characteristic. As the plate current being controlled by the facsimile signal voltage impressed on the grid approaches zero, it has a tendency to follow a non-linear curve with respect to the applied signal. While the upper portion of the tube plate current versus grid voltage characteristic will generally be linear, the curvature at the lower end distorts the reproduction of the

2 light gray tones. It therefore is desirable to correct or eliminate the lower bend of the plate current characteristic in order to improve the facsimile recording especially with respect to the lighter tones.

It has been found, according to the present invention, that a bias current opposed to the normal plate current of the output tube or tubes can be added to the plate current circuit to eliminate, in the recorder circuit, that portion of the plate current which is non-linear. In one type of circuit employing this "bucking current" system, a grid bias voltage is applied to the grid or grids of the output tubes of such a value that current will continuously flow in these tubes in the absence of input signal voltages, and the amount of current will be above the non-linear portion of the plate current curve. This will be the current in the plate circuit which flows when no input facsimile signal is impressed, thus corresponding to white in the recording.

In addition, a steady current is added in opposition to the plate current as far as the recording electrodes are concerned. Thus, with zero input of the facsimile signal the residual plate current is neutralized and white is produced on the recording sheet. Any applied signals will then produce recording currents which are linear with respect to such signals. With a condition such as this, it is possible to have the plate current flow in a vacuum tube vary between a selected low point on the characteristic curve and a higher point on the same curve such that the variation is linear along all points in between with respect to the grid voltage or facsimile signal.

One object of the present invention is to provide a method of and means for improving the fidelity of electrolytically recorded facsimile copy.

Another object is to improve, particularly, the linearity of low density values in the recorded copy of an electrolytic facsimile recording system.

Still another object is to compensate a facsimile electrolytic recording system so that recording currents can be carried down to substantially zero current without passing through the non-linear lower band of the usual plate current characteristic of a thermionic vacuum tube.

A further object is to "buck-out" the current corresponding to the lower band of the plate current characteristics of a thermionic vacuum tube feeding the recording electrodes of an electrolytic facsimile recording system and the like.

These and other objects of the present invention will be apparent to those skilled in the art from the detailed description of the present invention given in connection with the various figures of the drawings.

Figure 1:
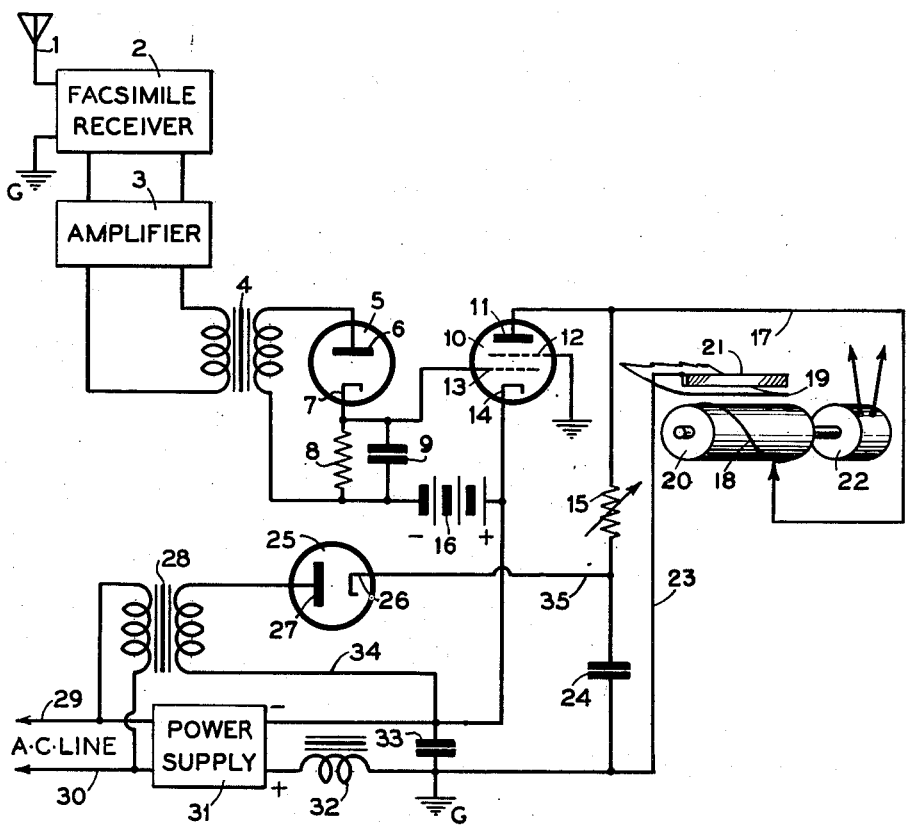
Fig. 1 shows a circuit diagram partly in block of a preferred form of the present invention.

In Fig. 1, facsimile signals to be recorded may be derived from any suitable source as, for instance, facsimile receiver 2 connected to antenna 1 and to ground G. The received signals after suitable amplification and detection are applied to amplifier 3 which feeds the primary of transformer 4. The secondary of transformer 4 is connected to plate 6 of diode 5 and through load resistor 8 to cathode 7. Load resistor 8 is bypassed by capacitor 9 to remove subcarrier signals from the direct current output facsimile signal. The rectified facsimile signal appearing across load resistor 8 is applied to grid 13 of output tube 10. The initial bias between cathode 14 and grid 13 is determined by suitable means such as grid bias battery 16. Output tube 10 may be any suitable type, although a pentode or tetrode having constant plate current characteristics, as shown, is particularly suitable. The tetrode shown, has a cathode 14, heated by suitable means not shown, control grid 13, screen grid 12, and plate 11. The facsimile recorder includes helical electrode 18 mounted on drum 20 and rotated by motor 22, and linear electrode 21, the intersection of the two electrodes being through recording sheet 19. Plate 11 is connected to helical electrode 18 over lead 17. Linear electrode 21 is connected by means of lead 23 to the positive end of power supply 31 through filter choke 32. The negative end of power supply 31 is connected to cathode 14. Power supply 31 receives its input from A. C. line 29—30 and utilizes condenser 33 to filter out any A. C. ripple.

Figure 2:
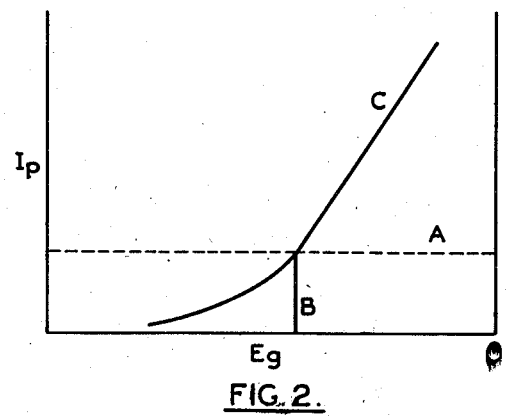
Fig. 2 shows a curve useful in explaining the operation of the circuit shown in Fig. 1.

In the circuit, as described up to this point, a current will be passed through the recording sheet 19 determined by the plate voltage from power supply 31, the characteristic of tube 10, the impedance of the recording sheet between electrodes 18 and 21, and the bias on grid 13 supplied by battery 16 when no input facsimile signal is present. With suitable choice and adjustment of these constants this no-signal current will be that current determined by the intersection of dotted line A and tube characteristic curve C as shown in Fig. 2. But, as stated in the fore part of this description, any current flowing through recording paper 19 will produce a mark in the paper, the density of the mark being determined by the amount of current flow present. If there is no current flowing through the recorder, there will be no mark and the recording paper will remain white. If full current is flowing through the paper, a full black mark will be produced in the recording sheet. Therefore, having determined the lower end of the linear portion of the characteristic curve C of Fig. 2, it now becomes necessary to permit this current to flow in the vacuum tube 10 when no input signal is present but it is also required to prevent this current from flowing through the recorder circuit. The latter is accomplished by the "bucking" circuit described below.

In Fig. 2, BO represents the amount of negative bias supplied by battery 16 to grid 13. As facsimile signals are received and rectified by tube 5, a positive bias increment is supplied to grid 13 depending upon the strength of the facsimile signal, which will cause plate current to increase along curve C. It will be seen that the increase in plate current is substantially linear above line A. Since the plate current flowing in tube 10 above line A is also the recording current passing through the recorder electrodes and the recording sheet this current should be linear in relation to the facsimile signal. In other words A may be considered the zero line or the point of zero input signal, and hence the recording current, starting at this point increases linearly in proportion to the facsimile signal for all values of facsimile signals greater than zero. The "bucking-out" of current A is attained in the circuit of Fig. 1, as described below.

Fig. 1 shows means for "bucking-out" this initial current below line A of Fig. 2, so that linear amplification will exist in this last stage of the recording system. A suitable and convenient means for developing this bucking current is shown in the form of rectifier 25, fed by the secondary of alternating current transformer 28 connected between the negative side of power supply 31, and plate 27 of rectifier 25 through lead 34. Cathode 26 of rectifier 25, heated by a conventional means not shown is connected by means of lead 35 to one side of a filter capacitor 24. The other side of filter capacitor 24 is connected to the positive side of power supply 31. To complete the circuit, resistor 15 which may be adjustable is connected between plate 11 and lead 35. The primary of alternating current transformer 28 is connected to the alternating current lines 29—30.

Since the recorder electrodes 21 and 18 together with the recording paper 19 and resistor 15 complete the circuit around condenser 24, current will tend to flow through line 23, linear electrode 18, paper 19, helical electrode 21 and resistor 15 to the other side of condenser 24. The amount of current flowing will depend upon the potential across 24 and the impedance of the circuit. It should be noted that this current flow is opposite to the current flow from condenser 33, wherein the flow is from cathode 14 to plate 11 through helix 21, paper 19, and linear electrode 21 back to condenser 33. It will be seen that the current flowing through resistor 15 causes a current to flow from helix 18 to linear electrode 21 while the current flowing through tube 10 flows from linear electrode 21 to helical electrode 18. By making the current flowing through resistor 15 equal to the current determined by line A in Fig. 2, conditions become such that, when the tube is drawing current A, the "bucking" circuit is also producing a current effect A in an equal and opposite manner across the electrodes 18 and 21 and therefore no current will flow through the recorder circuit and no marking will be produced on recording sheet 19. Thus with no facsimile signal (corresponding to white in the record) tube 10 passes current A while the "bucking" circuit supplies an equal and opposite current so that no net current flows between the recording electrodes through the recording sheet. Any facsimile signal will cause a current to flow through the recording sheet, such current increasing linearly along curve C from line A.

The resulting recording on the recording sheet will be a faithful reproduction of the original tone values for all density values from zero density or pure white to the maximum density of which the system is capable.

While only a single embodiment of the pres-

What is claimed is:

1. In a facsimile recorder, the combination of, a vacuum tube having at least a cathode, a control grid, a screen grid and a plate, a source of facsimile signals applied to the grid circuit of said tube, facsimile recording electrodes, electrolytic recording paper and a first source of plate voltage connected in series in circuit with the plate and cathode of said tube, said tube being characterized by having a non-linear grid voltage-plate current relationship below a predetermined value of plate current, and an impedance and a second source of plate voltage connected in series in circuit with the plate and cathode of said tube, said impedance and second voltage being selected to effect the flow of said predetermined value of plate current in the tube, whereby facsimile signals applied to the grid of the tube cause additional plate current which flows through the recording paper and which bears a linear relationship with the voltage of the facsimile signal.

2. In a facsimile recorder, a constant-current vacuum tube circuit wherein plate current is substantially independent of plate load impedance, and plate current is a linear function of grid voltage above a predetermined value of plate current, facsimile recording electrodes, electrolytic recording paper and a first source of plate voltage connected in series in circuit with said vacuum tube, and an impedance and a second source of plate voltage connected in series also in circuit with said vacuum tube, said impedance and second plate voltage being selected to effect the flow of said predetermined value of plate current in the tube, whereby facsimile signals applied to the grid of the tube cause additional plate current which flows through the recording paper and which bears a linear relationship with the voltage of the facsimile signal.

FRANK A. HESTER.
JOHN W. SMITH.

REFERENCES CITED

The following references are of record in the file of this patent:

UNITED STATES PATENTS

| Number | Name | Date |
|---|---|---|
| 1,839,067 | Warner | Dec. 29, 1931 |
| 2,340,714 | Traver et al. | Feb. 1, 1944 |
| 2,434,531 | Wilson et al. | Jan. 13, 1948 |
| 2,459,521 | Greig | Jan. 18, 1949 |